United States Patent
Song

(10) Patent No.: US 8,562,448 B2
(45) Date of Patent: Oct. 22, 2013

(54) JOINT STRUCTURE

(75) Inventor: Shang-Xuan Song, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 513 days.

(21) Appl. No.: 12/911,920

(22) Filed: Oct. 26, 2010

(65) Prior Publication Data

US 2011/0236125 A1 Sep. 29, 2011

(30) Foreign Application Priority Data

Mar. 24, 2010 (CN) .......................... 2010 1 0131556

(51) Int. Cl.
*F16D 3/04* (2006.01)

(52) U.S. Cl.
USPC ........... 464/104; 464/136; 403/225; 403/292; 901/28

(58) Field of Classification Search
USPC ................ 403/225, 292, 298, 335, 337, 362; 74/490.05, 490.06; 901/28, 29; 464/70, 464/83, 85, 104, 105, 120, 121, 125, 136, 464/150
See application file for complete search history.

(56) References Cited

U.S. PATENT DOCUMENTS

| | | | |
|---|---|---|---|
| 1,171,347 A * | 2/1916 | Morse | 474/112 |
| 1,332,898 A * | 3/1920 | Hossie et al. | 408/82 |
| 1,584,424 A | 5/1926 | Bee | |
| 3,294,053 A * | 12/1966 | Emery, Jr. | 114/249 |
| 3,403,571 A * | 10/1968 | Sheckells | 74/421 R |
| 3,820,851 A * | 6/1974 | Longo et al. | 301/35.629 |
| 4,232,562 A * | 11/1980 | Perkins | 74/89.43 |
| 4,449,027 A * | 5/1984 | Fujikawa | 219/69.15 |
| 5,993,101 A * | 11/1999 | Kohno et al. | 403/305 |
| 6,155,742 A * | 12/2000 | Yang et al. | 403/337 |
| 6,327,924 B2 * | 12/2001 | Nagai et al. | 74/89.36 |
| 6,444,941 B1 * | 9/2002 | Russo | 219/69.15 |
| 6,488,439 B1 * | 12/2002 | Lackey, Sr. | 403/305 |
| 7,443,121 B2 * | 10/2008 | Nagai et al. | 318/434 |
| 7,516,991 B1 * | 4/2009 | Cheng | 285/404 |
| 7,540,663 B2 * | 6/2009 | Yum et al. | 384/103 |

FOREIGN PATENT DOCUMENTS

CN 1172006 A 2/1998

\* cited by examiner

*Primary Examiner* — Gregory Binda
*Assistant Examiner* — Nahid Amiri
(74) *Attorney, Agent, or Firm* — Altis & Wispro Law Group, Inc.

(57) ABSTRACT

A joint structure includes a sleeve, a connecting shaft, a plurality of elastic pieces and a cross-limiting stopper. The sleeve defines a receiving shaft hole and a first cross slot communicating with the receiving shaft hole. The connecting shaft is partially assembled and received within the receiving shaft hole of the sleeve, the connecting shaft defines a second cross slot corresponding to the first cross slot. The plurality of elastic pieces is elastically received within a space formed between the sleeve and connecting shaft. The cross-limiting stopper is mounted to and partially received within the second cross slot, and partially received in the first cross slot, to enable the connecting shaft to be radially and adjustably installed within the sleeve and prevent the connecting shaft from rotating relative to the sleeve.

14 Claims, 5 Drawing Sheets

JOINT STRUCTURE

BACKGROUND

1. Technical Field

The present disclosure relates to robotics, and particularly, to a joint structure for use in an industrial robot.

2. Description of Related Art

Industrial robots are widely used in various applications to greatly reduce the burden on factory workers. A robot arm is an important part of an industrial robot. A commonly used industrial robot generally includes a plurality of individually connected robot arms, with every two robot arms connected. A common joint structure is mounted to a distal end of the robot arm to interconnect the robot arm with a clamp for gripping an object. Thus, the clamp is controlled by the robot arm to manipulate a workpiece.

The typical joint structure includes a connecting shaft and a sleeve sleeved thereon. The connecting shaft includes a substantially cylindrical first connecting portion and a substantially cylindrical second connecting portion coaxially connected with the first connecting portion. The radial dimension of the first connecting portion exceeds that of the second connecting portion, but is less than the inner diameter of the sleeve. As the sleeve is attached to the connecting shaft, a spring is received within the radial clearance formed between the connecting shaft and the sleeve, to lessen or absorb the shock of impact and prevent damage to the entire joint structure. However, in use, the sleeve is easily rotated relative to the connecting shaft because of inexact structure and precision of assembly.

Therefore, there is a room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the joint structure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
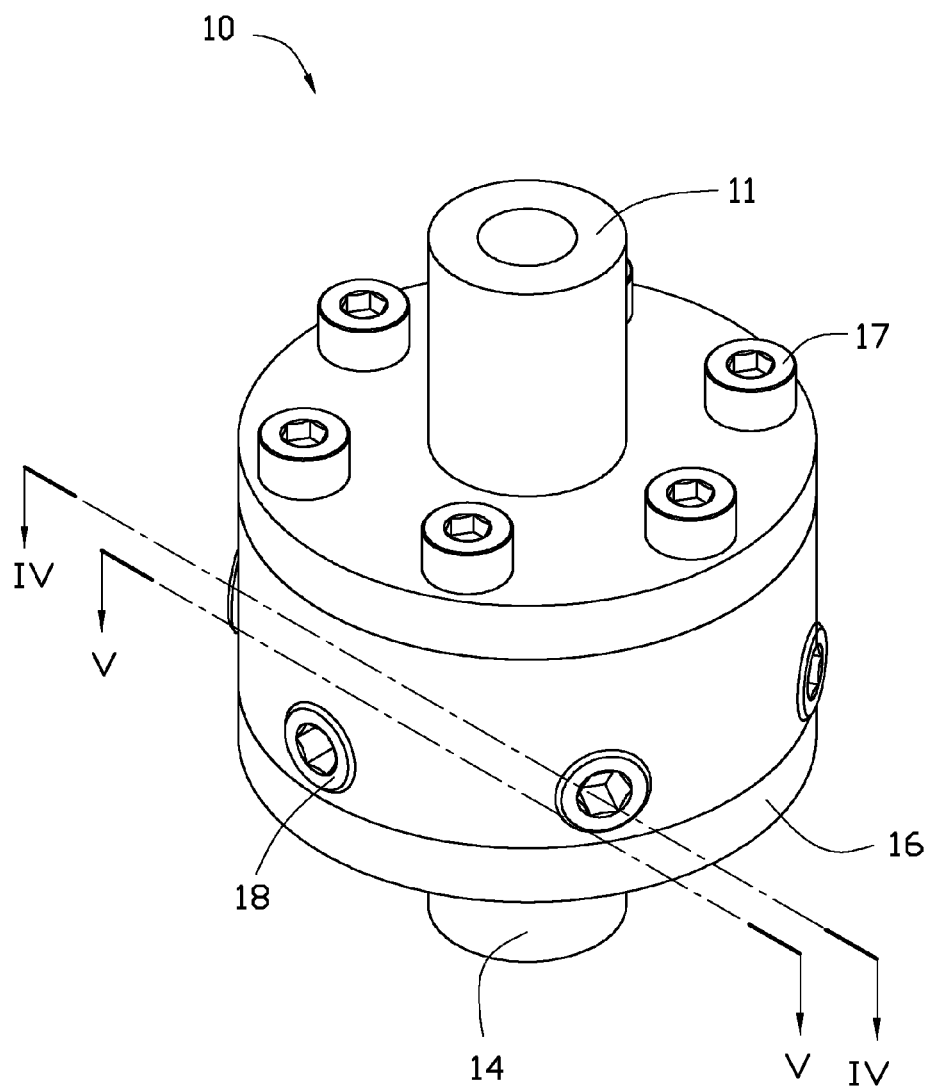
FIG. 1 is an assembled isometric view of an embodiment of a joint structure.
Figure 2:
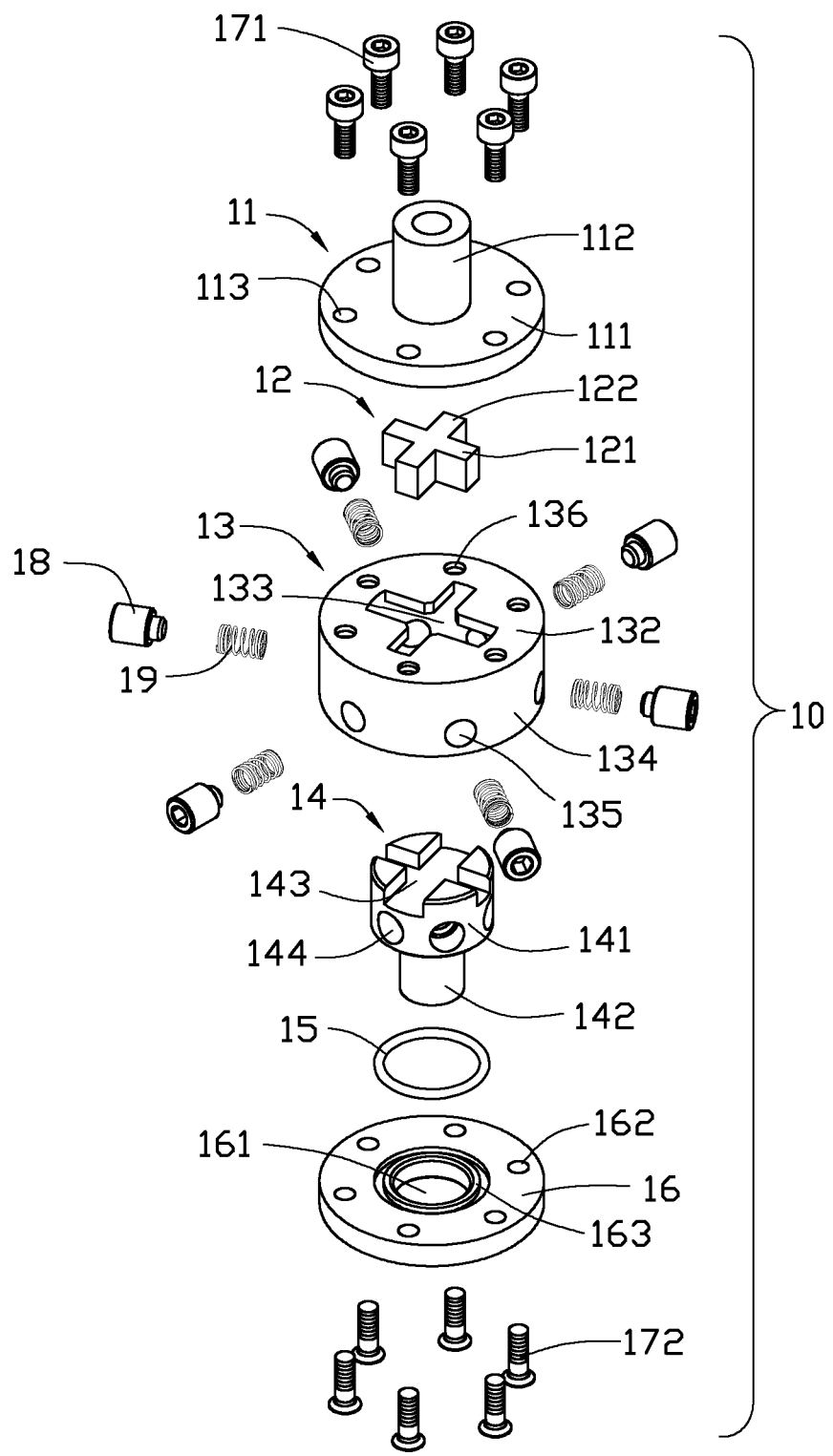
FIG. 2 is an exploded isometric view of the joint structure shown in FIG. 1.
Figure 3:
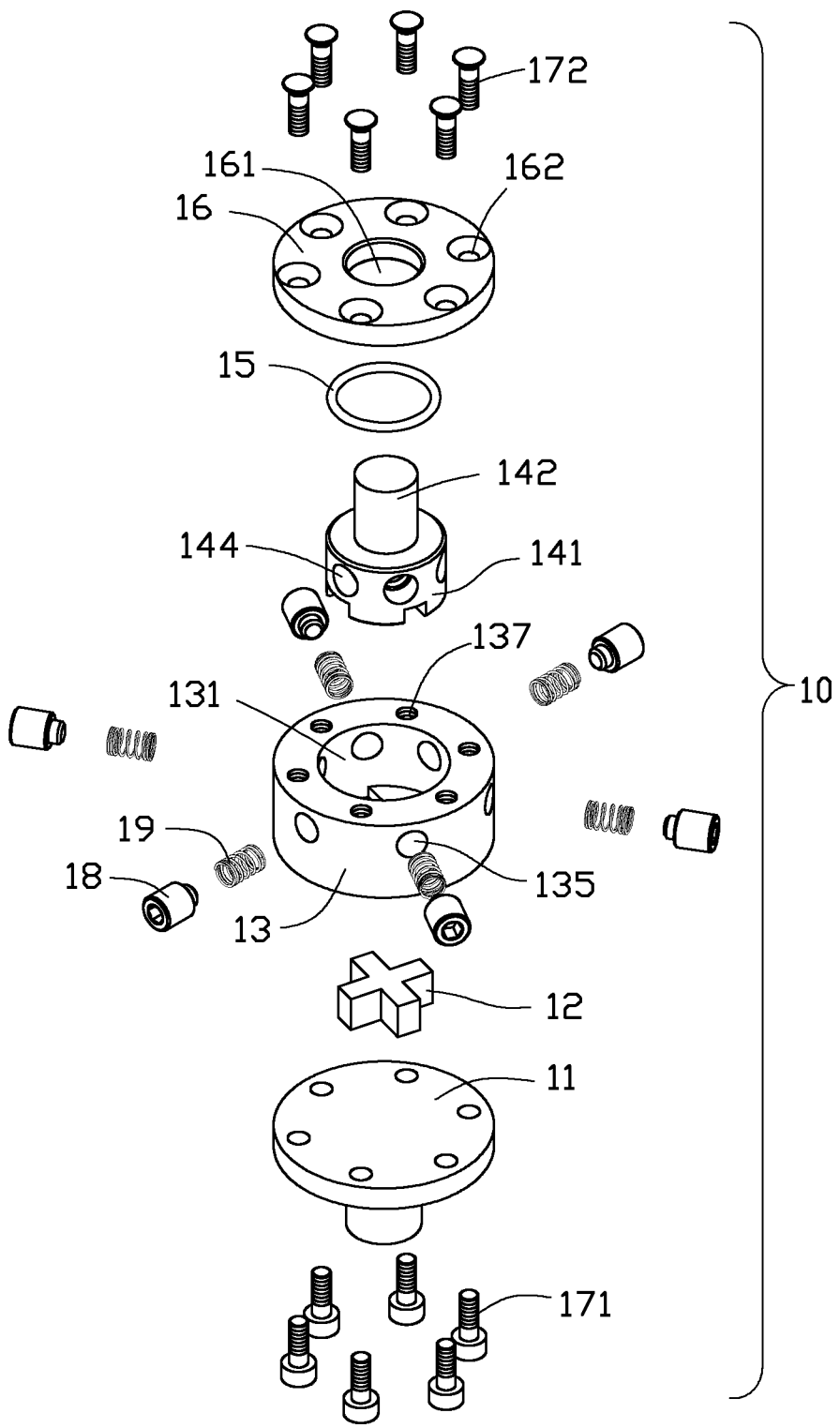
FIG. 3 is similar to the FIG. 2, but viewed from another aspect.

Referring to FIGS. 1 through 3, an embodiment of a joint structure 10 is shown. The joint structure 10 includes a connecting piece 11, a cross-limiting stopper 12, a sleeve 13, a connecting shaft 14, a buffer ring 15, an end cap 16, a plurality of first fixing pieces 171, a plurality of second fixing pieces 172, a plurality of locating pieces 18 and a plurality of elastic pieces 19. In the illustrated embodiment, six first fixing pieces 171, six second fixing pieces 172, and six locating pieces 18, all bolts, are deployed, and six elastic pieces 19, here springs, are as well.

The connecting piece 11 includes a substantially disk shaped base 111 and a fitting shaft 112 coaxially protruding from the central portion thereof. A plurality of mounting holes 113 is defined through the base 111 and positioned adjacent to the peripheral edge of the base 111, for assembly to a robot arm. In the illustrated embodiment, six mounting holes 113 are defined.

The cross-limiting stopper 12 is a substantially cruciform block, and includes a first arm 121 and a second arm 122. The first arm 121 and the second arm 122 are the same shape.

The sleeve 13 is substantially cylindrical and defines a circular receiving shaft hole 131 therein from one cross section of a end of the sleeve 13 axially, thereby forming an inner bottom wall 132 adjacent to the opposite end of the sleeve 13, and a peripheral wall 134. A first cross slot 133 is defined through the bottom wall 132 of the receiving shaft hole 131 to communicate with the opposite end of the sleeve 13, and is configured for receiving the cross-limiting stopper 12 therein. A plurality of assembly holes 135 are defined through the peripheral wall 134 along the radial axis of the receiving shaft hole 131. A plurality of first securing holes 136 are defined in the cross section of the sleeve 13 and positioned adjacent to the peripheral edge of the cross section and surrounding the first cross slot 133. A plurality of second securing holes 137 are defined in the opposite cross section of the sleeve 13 and positioned adjacent to the peripheral edge of the cross section and surrounding the receiving shaft hole 131. In the illustrated embodiment, six assembly holes 135, six first securing holes 136 and six second securing holes 137 are deployed. The first cross slot 133 is substantially cruciform and includes a first bar-shaped slot 1331 crossed by a second bar-shaped slot 1332. The first bar-shaped slot 1331 is of width and length exceeding the corresponding first arm 121 of the cross-limiting stopper 12. The second bar-shaped slot 1332 is of width substantially the same as the second arm 122, and longer than the second arm 122 (shown in FIG. 4).

The connecting shaft 14 is a substantially stepped shaft, and includes a cylindrical first connecting portion 141 and a second connecting portion 142 coaxially connected with the first connecting portion 141. The diameter of the first connecting portion is less than that of the receiving shaft hole 131. The first connecting portion 141 is assembled and received within the receiving shaft hole 131. A second cross slot 143 is defined in one cross section of the distal end of the first connecting portion 141, corresponding to the first cross slot 133 and the cross-limiting stopper 12. The second cross slot 143 is substantially cruciform, and includes a third bar-shaped slot 1431 crossed by a fourth bar-shaped slot 1432. The third bar-shaped slot 1431 is of width substantially the same as that of the first arm 121 of the cross-limiting stopper 12, and is longer than the first arm 121. The fourth bar-shaped slot 1432 is of width and length exceeding those of the second arm 122 (shown in FIG. 5). A plurality of receiving holes 144 is defined in the peripheral wall of the first connecting portion 141 corresponding to the assembly holes 135 of the sleeve 13. In the illustrated embodiment, six receiving holes 144 are deployed. The second connecting portion 142 has a diameter less than that of the first connecting portion 141.

The end cap 16 is substantially disk shaped, and includes a shaft hole 161 defined through the substantially central portion thereof. A plurality of fixing holes is 162 defined through the end cap 16 and positioned adjacent to the edge of the end cap 16, corresponding to the second securing holes 137 of the sleeve 13. In the illustrated embodiment, six fixing holes 162 are deployed. An annular buffer slot 163 is recessed from the central portion of the end cap 16 and positioned surrounding the shaft hole 161. The buffer ring 15 has a shape substantially the same as that of the annular buffer slot 163, such that it can be received therein.

Figure 4:
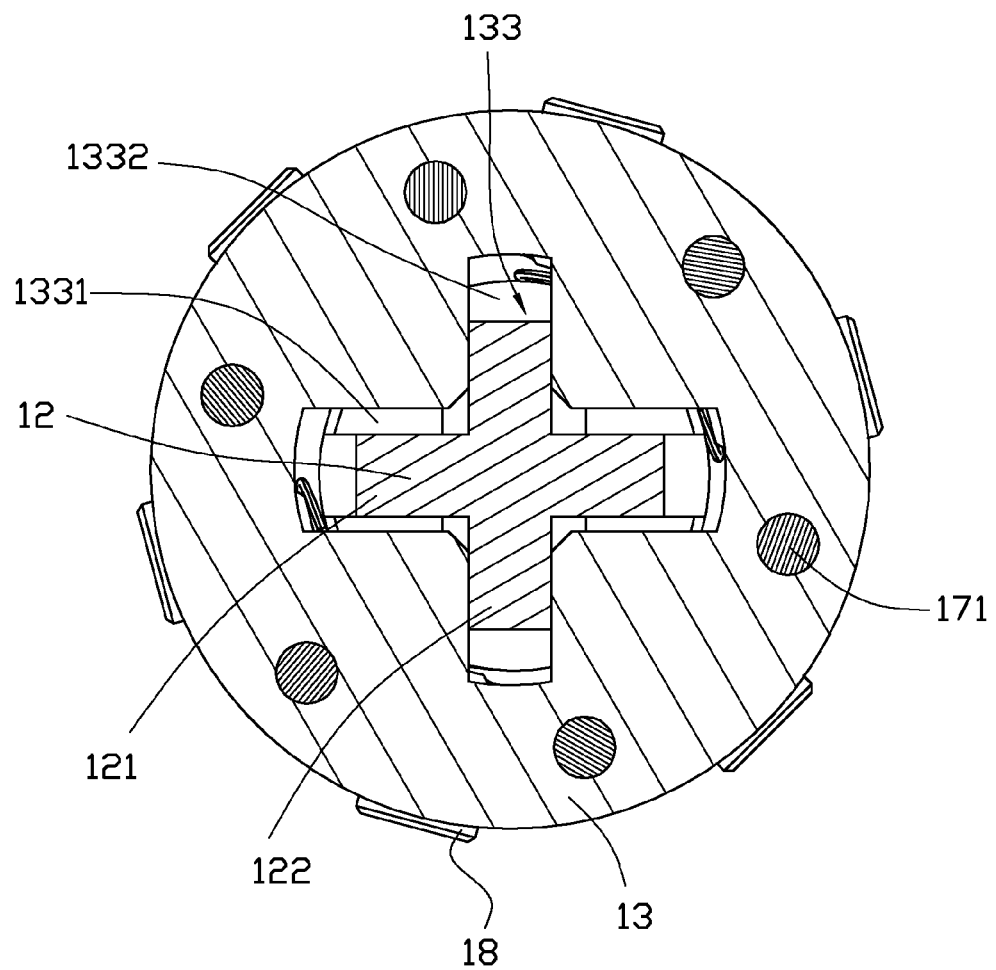
FIG. 4 is a cross-section of the joint structure of FIG. 1 taken along line IV-IV.
Figure 5:
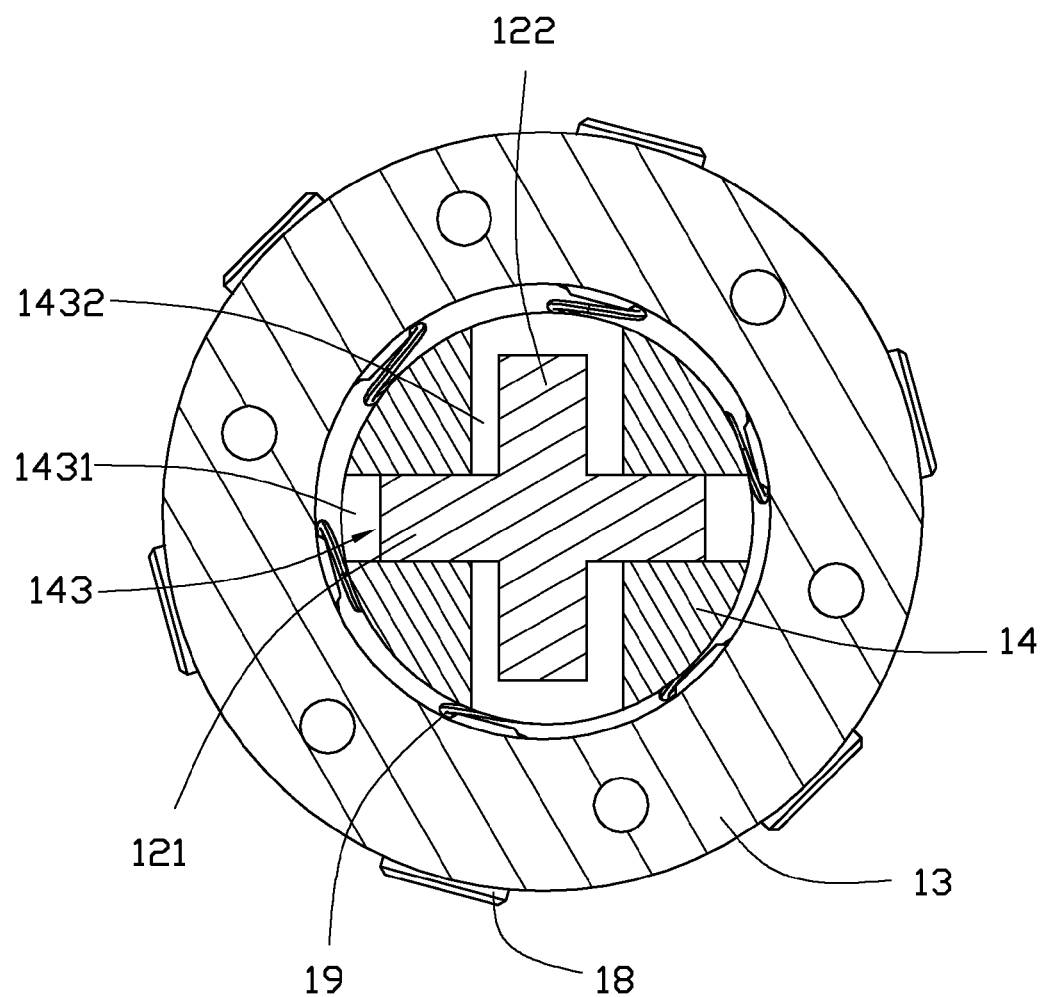
FIG. 5 is a cross-section of the joint structure of FIG. 1 taken along line V-V.

Also referring to FIGS. 4 and 5, during assembly of the joint structure 10, the connecting piece 11 is secured to the bottom wall 132 via the first fixing pieces 171, the six first fixing pieces 171 respectively pass through the mounting holes 113 of the connecting piece 11 and are secured to the corresponding first securing holes 136 of the sleeve 13. The cross-limiting stopper 12 is mounted to and partially received within the second cross slot 143 of the connecting shaft 14. The first connecting portion 141 of the connecting shaft 14 together with the cross-limiting stopper 12 is received in the receiving shaft hole 131 of the sleeve 13. The cross-limiting stopper 12 is partially received in the first cross slot 133, such that the cross-limiting stopper 12 is sandwiched between the first connecting portion 141 and connecting piece 11, the cross-limiting stopper 12 together with the connecting shaft 14 is radially slidably and adjustably installed within the sleeve 13. The receiving holes 144 of the connecting shaft 14 align with the corresponding assembly holes 135 of the sleeve 13.

The buffer ring 15 is latched into the annular buffer slot 163 of the end cap 16 for enhancing shock resistance of the end cap 16. The end cap 16 together with the buffer ring 15 is then fixed to the sleeve 13 via the second fixing pieces 172, and sleeved on the second connecting portion 142 for covering the receiving shaft hole 131. The second connecting portion 142 passes through the shaft hole 161 and is exposed to the outside of the sleeve 13. The six elastic pieces 19 are respectively received in the corresponding assembly holes 135 of the sleeve 13 and partially received within the corresponding receiving holes 144 of the connecting shaft 14. Finally, the six locating pieces 18 are respectively threaded into the corresponding assembly holes 135 of the sleeve 13 to complete assembly of the joint structure 10.

In use, the joint structure 10 is assembled to a distal end of a robot arm (not shown) of an industrial robot (not shown) to interconnect the robot arm with a clamp (not shown). The connecting piece 11 is fixed with the robot arm and the opposite second connecting portion 142 of the joint structure 10 is secured to the clamp. When the clamp experiences impact, the connecting shaft 14 together with the cross-limiting stopper 12 could slide relative to the sleeve 13 radially along two different axes formed by the first cross slot 133 and the second cross slot 143. Meanwhile, the connecting shaft 14 resists and stretches the corresponding elastic pieces 19 to lessen or absorb the shock impact from outside to the entire joint structure 10. Interconnection of the cross-limiting stopper 12 by the connecting shaft 14 with the sleeve 13, efficiently prevents the connecting shaft 14 from rotating relative to the sleeve 13 when the entire joint structure 10 experiences impact. After impact, the connecting shaft 14 together with the cross-limiting stopper 12 returns to its original position via the elastic pieces 19.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A joint structure, comprising:
a sleeve defining a receiving shaft hole and a first cross slot communicating with the receiving shaft hole;
a connecting shaft partially assembled and received within the receiving shaft hole of the sleeve, the connecting shaft defining a second cross slot corresponding to the first cross slot;
a plurality of elastic pieces elastically received within a space formed between the sleeve and the connecting shaft; and
a cross-limiting stopper mounted to and partially received within the second cross slot of the connecting shaft, and partially received in the first cross slot of the sleeve, wherein the cross-limiting stopper comprises a first arm and a second arm crossed by the first arm; the first cross slot and the second cross slot are both cruciform, each of the first cross slot and the second cross slot comprises two bar-shaped slots crossed by each other, the cross-limiting stopper is slidable relative to the connecting shaft and the sleeve along two different axes formed by the first cross slot and the second cross slot, such that the connecting shaft is radially adjustably installed within the sleeve and the connecting shaft is prevented rotating relative to the sleeve.

2. The joint structure as claimed in claim 1, wherein the first cross slot includes a first bar-shaped slot and a second bar-shaped slot, the first bar-shaped slot is of width and length exceeding that of the corresponding first arm of the cross-limiting stopper, the second bar-shaped slot is of width substantially the same as that of the second arm, and is longer than the second arm.

3. The joint structure as claimed in claim 2, wherein the second cross slot includes a third bar-shaped slot and a fourth bar-shaped slot, the third bar-shaped slot is of width substantially the same as that of the first arm of the cross-limiting stopper, and is longer than the first arm; the fourth bar-shaped slot is of width and length exceeding that of the second arm.

4. The joint structure as claimed in claim 1, wherein the connecting shaft further defines a plurality of receiving holes in the peripheral wall thereof; the elastic pieces are respectively elastically accommodated within the space with one end of each elastic piece received in the corresponding one receiving hole.

5. The joint structure as claimed in claim 4, wherein the joint structure further includes a plurality of locating pieces, the sleeve further comprises a plurality of assembly holes defined through the peripheral wall thereof to communicate with the receiving shaft hole radially and align with the corresponding receiving holes of the connecting shaft, the opposite end of the elastic pieces are respectively received within the corresponding assembly holes via the plurality of locating pieces.

6. The joint structure as claimed in claim 1, wherein the connecting shaft is a substantially stepped shaft, and includes a cylindrical first connecting portion and a second connecting portion coaxially connected with the first connecting portion; the diameter of the first connecting portion is greater than a diameter of the second connecting portion but less than that of the receiving shaft hole, the first connecting portion is assembled and received within the receiving shaft hole.

7. The joint structure as claimed in claim 6, wherein the joint structure further comprises an end cap having a shaft hole defined therethrough, the end cap is fixed to a distal end of the sleeve opposite to the first cross slot for covering the receiving shaft hole; the second connecting portion passes through the shaft hole and is exposed to an outside of the sleeve.

8. The joint structure as claimed in claim 7, wherein the end cap further comprises an annular buffer slot recessed therefrom and positioned surrounding the shaft hole, the joint structure further comprises a buffer ring assembled within the annular buffer slot and sleeved on the second connecting portion.

9. The joint structure as claimed in claim 7, wherein the joint structure further comprises a connecting piece secured to the first cross slot of the sleeve, such that the cross-limiting stopper is sandwiched between the connecting piece and connecting shaft.

10. A joint structure, comprising:
- a sleeve defining a receiving shaft hole and a first cross slot communicating with the receiving shaft hole;
- a connecting shaft partially assembled within the receiving shaft hole of the sleeve, the connecting shaft defining a second cross slot corresponding to the first cross slot; and
- a cross-limiting stopper mounted to and partially received within the second cross slot of the connecting shaft, and partially received in the first cross slot of the sleeve, wherein the cross-limiting stopper comprises a first arm and a second arm crossed by the first arm; the first cross slot and the second cross slot are both cruciform, each of the first cross slot and the second cross slot comprises two bar-shaped slots crossed by each other, the cross-limiting stopper is slidable relative to the connecting shaft and the sleeve along two different axes formed by the first cross slot and the second cross slot, such that the connecting shaft is radially adjustably installed within the sleeve and the connecting shaft is prevented rotating relative to the sleeve.

11. The joint structure as claimed in claim 10, wherein the joint structure further comprises a connecting piece secured to the first cross slot of the sleeve, such that the cross-limiting stopper is sandwiched between the connecting piece and connecting shaft.

12. The joint structure as claimed in claim 11, wherein the connecting shaft is a substantially stepped shaft, and includes a first connecting portion and a second connecting portion coaxially connected with the first connecting portion; the first connecting portion is assembled and received within the receiving shaft hole, the second cross slot is defined in a cross section of a distal end of the first connecting portion, the second connecting portion is exposed to an outside of the sleeve.

13. The joint structure as claimed in claim 12, wherein the joint structure further comprises an end cap having a shaft hole defined therethrough, the end cap is fixed to a distal end of the sleeve opposite to the first cross slot for covering the receiving shaft hole; the second connecting portion passes through the shaft hole and is exposed to the outside of the sleeve.

14. The joint structure as claimed in claim 13, wherein the end cap further comprises an annular buffer slot recessed therefrom and positioned surrounding the shaft hole, the joint structure further comprises a buffer ring assembled within the annular buffer slot and sleeved on the second connecting portion.

* * * * *